United States Patent [19]

Shepherd

[11] Patent Number: 4,850,388

[45] Date of Patent: Jul. 25, 1989

[54] DOUBLE VALVE FOR EMPTYING A CYLINDER

[75] Inventor: Michael V. Shepherd, Soquel, Calif.

[73] Assignee: Accurate Gas Control Systems, Inc., Soquel, Calif.

[21] Appl. No.: 246,551

[22] Filed: Sep. 19, 1988

[51] Int. Cl.$^4$ .............................................. F16K 11/10
[52] U.S. Cl. ................................. 137/212; 222/400.7; 137/557
[58] Field of Search ........................ 137/212, 209, 557; 222/400.7

[56] References Cited

U.S. PATENT DOCUMENTS

| | | | |
|---|---|---|---|
| 532,872 | 7/1894 | Stahl | 137/212 |
| 3,026,006 | 3/1962 | Frankfurt | 222/400.7 |
| 3,925,033 | 12/1975 | Mayo | 48/144 |

OTHER PUBLICATIONS

Superior Valve Company blueprint, Drawing No. 1042BX8.

*Primary Examiner*—Alan Cohan
*Attorney, Agent, or Firm*—Townsend and Townsend

[57] ABSTRACT

A double valve for dispensing from or emptying a cylinder independently of internal cylinder pressure includes a first and second spring loaded toggle valve, an input port, an output port, a dip tube, and first and second monitoring ports to facilitate monitoring of pressure within and without the cylinder. A source of pressurized inert gas is connected to the input port, volatilizing the contents of the cylinder and expelling them through the output port. Communication between the input port and output port is controlled by the first and second spring loaded toggle valves.

2 Claims, 3 Drawing Sheets

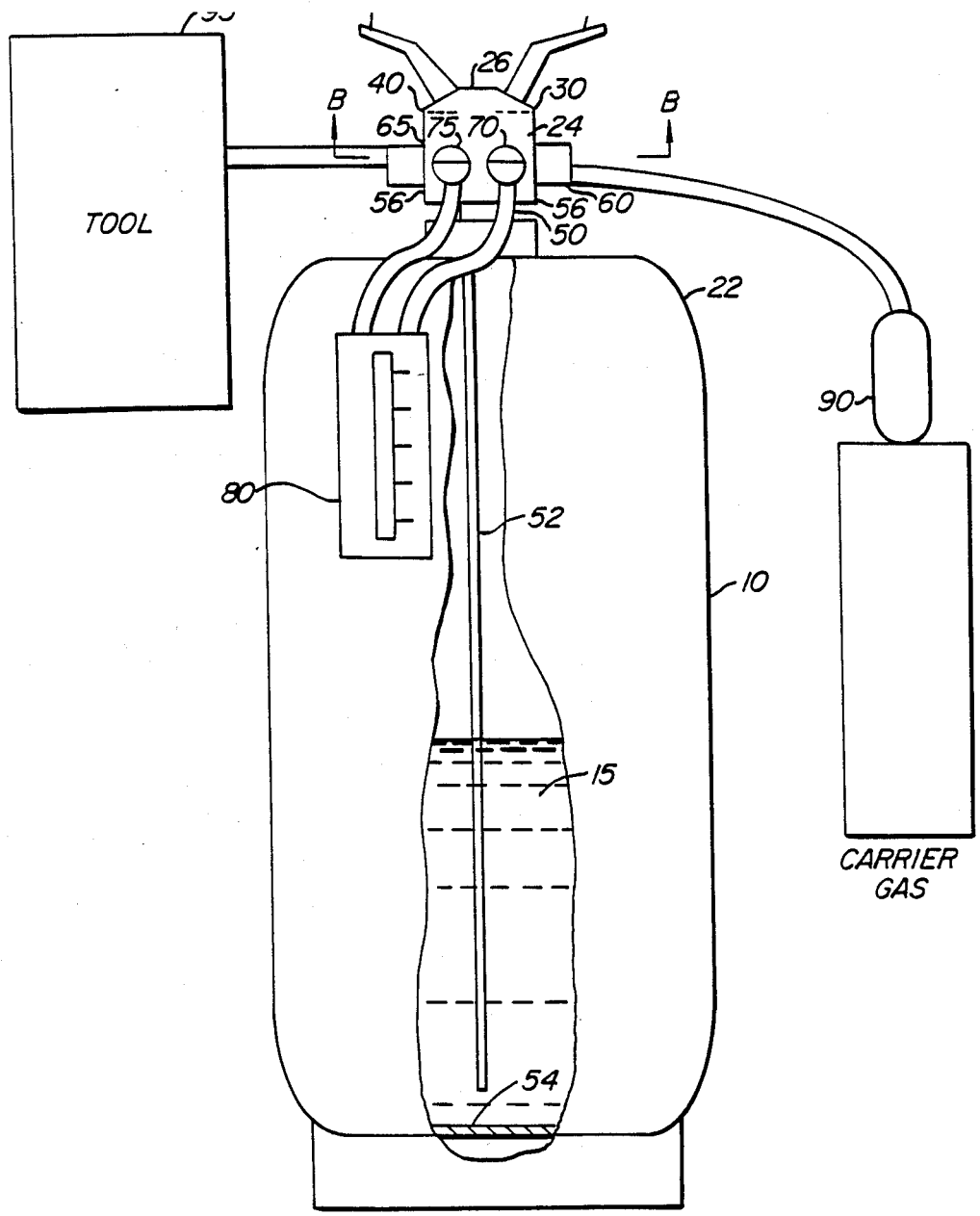
FIG._1.

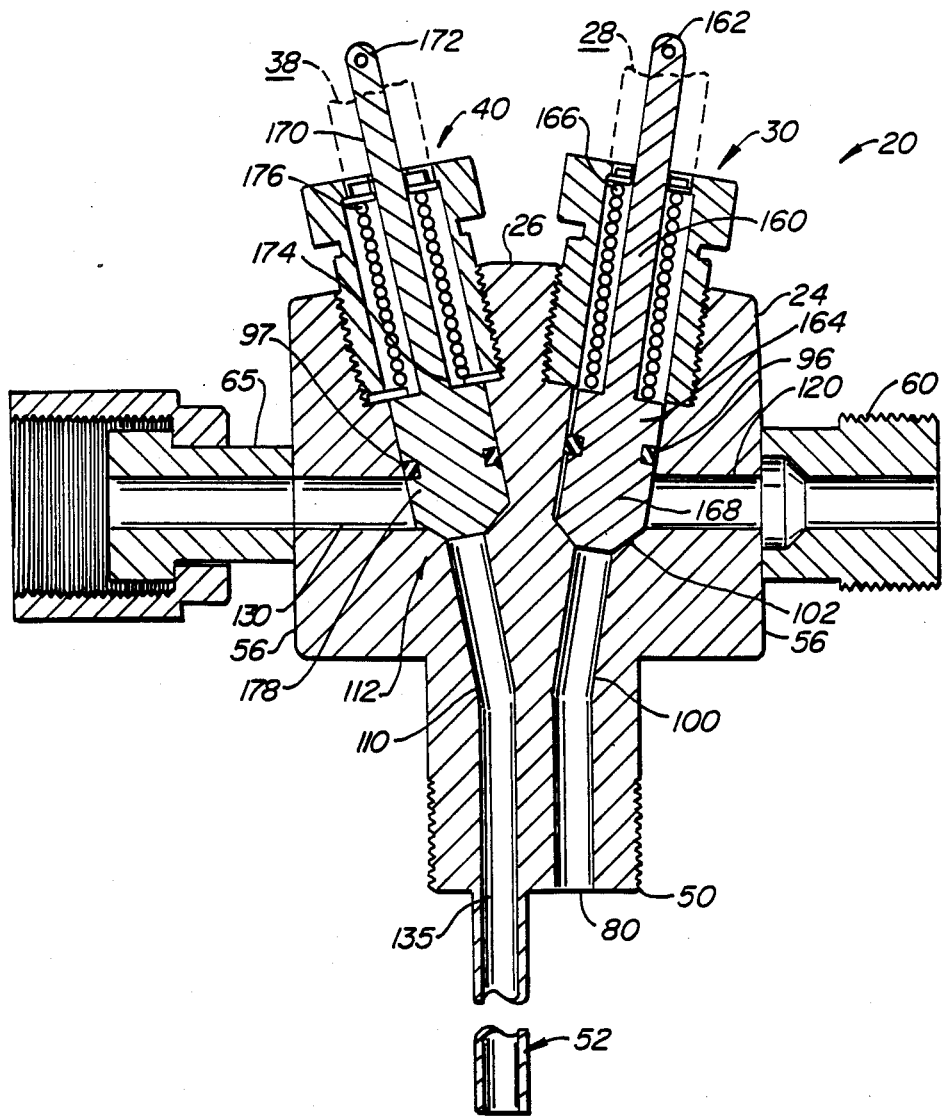
FIG._2.

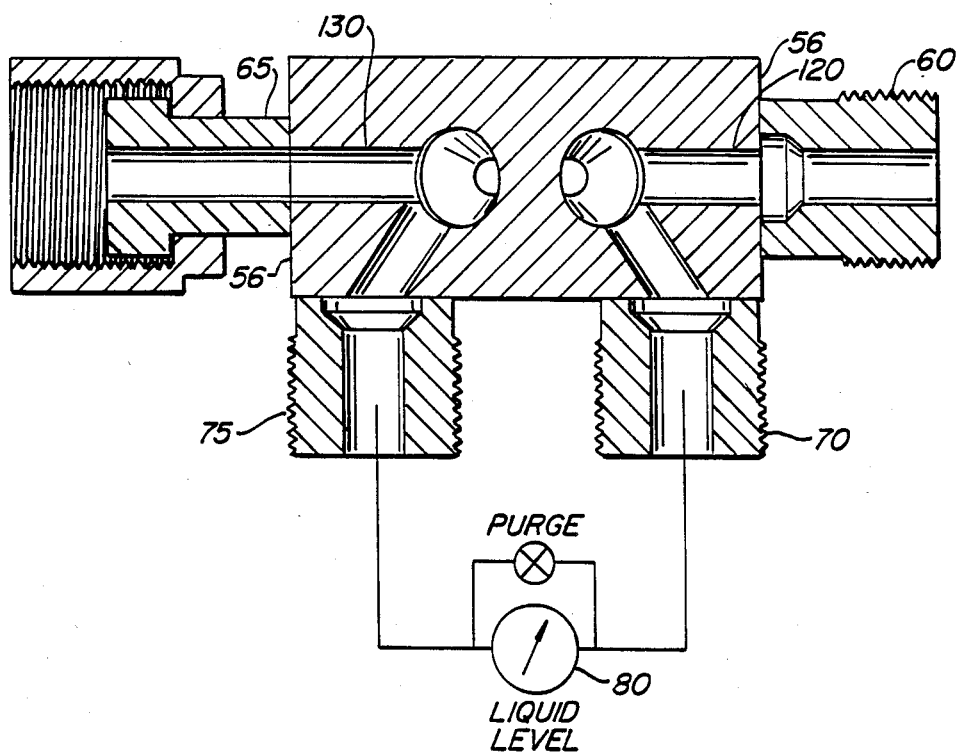
FIG._3.

DOUBLE VALVE FOR EMPTYING A CYLINDER

BACKGROUND OF THE INVENTION

1. Field of the Invention

The invention relates generally to valves for cylinders, and more particularly to a double valve for emptying a cylinder independently of the pressure within the cylinder while providing pressure monitoring ports.

2. Background and Description of Prior Art

Cylinders having a single valve on the top are frequently used to store or transport hazardous liquids and gases. The cylinder is partially emptied by opening the valve and allowing the internal pressure within the cylinder to expel the contents through the valve. The emptying process continues only as long as the cylinder pressure is positive with respect to the external pressure. The emptying process halts when the pressure is no longer positive, and the remaining cylinder contents cannot be readily emptied.

In the past it was difficult to know how empty the cylinder really was. The cylinder was weighed before and during the emptying process and the net weight provided information, accurate to perhaps 10% or 15% of full scale, as to how empty the cylinder was. It was desired, however, to have more accurate information as to the degree of emptiness of the cylinder. In many applications, the inability to substantially completely empty and thus use 100% of the gas in the cylinder is unacceptable. Tungsten hexafluoride, for example, costs approximately $15,000 per cylinder, and leaving 10% of this gas behind in an "almost-empty" cylinder would cost $1,500. Other gases used in the semiconductor industry such as hydrogen fluoride or boron trichloride are toxic to humans. Another industrial gas, dichlorosilane, is not only toxic, but explodes at atmospheric conditions. Obviously it is important to completely empty a cylinder of such gases to avoid a dangerous situation in case someone inadvertently opens a not-quite "empty" cylinder containing these materials.

Past solutions for further emptying the cylinder include heating the cylinder to increase the internal pressure. However heating is dangerous and can produce an explosion, especially when the cylinder contains hazardous substances. Heating can also cause the cylinder walls to be chemically attacked by the cylinder contents. Further, heating the cylinder may require heating of all connecting plumbing to avoid condensation. Heating also disturbs the calibration of any flow meters connected to the system to monitor the emptying process. A related solution includes connecting the outlet side of the valve to a vacuum system, thereby making the pressure in the cylinder effectively more positive.

A more practical solution is to pressurize the cylinder with an inert gas such as nitrogen or argon from an external source. In some cases the inert gas atomizes the cylinder contents and volatilizes or blows the contents out the valve. Such aerosol techniques are not suitable, however, for dispensing materials in highly controlled applications such as in the semiconductor industry where impurity content must be tightly controlled.

U.S. Pat. No. 3,925,033 to Mayo (1975) discloses a system for bubbling a combustible gas through a liquid in a cylinder to increase the mixture of gases which burn with a hotter flame. Mayo's device uses separate inlet and outlet valves and uses considerable plumbing to accomplish the mixing.

Prior art apparatus for emptying a cylinder have relatively obstructed flow passages through which the gas being emptied must pass. Such obstructed passages, coupled with "dead spaces" that are typically found in prior art valves, make it difficult to purge the cylinder system. The lack of effective purging can result in contamination when trapped ambient air mixes with the gas to be emptied. Contamination is intolerable where pure gases are being handled, such as in the semiconductor industry. Further, contamination of hazardous gases can result in toxic conditions or explosions.

3. Objectives of the Invention

It is an objective of the invention to provide a compact and safe valve mechanism to facilitate the dispensing of or emptying of the contents of a cylinder regardless of internal pressure in the cylinder.

It is another objective to provide a valve mechanism that eliminates dead space and obstructed passageways, thereby facilitating the complete purging of the cylinder emptying system without recourse to vacuum pumps or heating.

It is a further objective to provide a valve mechanism that facilitates the accurate monitoring of differential pressuring to enable an accurate measurement of the quantity of gas still in the cylinder being emptied.

It is a still further objective to provide a valve mechanism that exhibits positive valve closure at all times, and provides a pressure release function as well.

SUMMARY OF THE INVENTION

The present invention provides a double valve for emptying a cylinder independently of the pressure within the cylinder, while providing connections for the accurate measurement of internal and external pressure to facilitate the emptying process.

The double valve includes a housing that is attached to the top of the cylinder to be emptied. A first, second, third, and fourth cylindrical unobstructed passageway are included in the housing, as is a first and second valve mounting chamber. Valves for mounting in the valve chambers are known in the art and include spring loaded toggle valves and bellows valves. In a preferred embodiment, a first spring loaded toggle valve is mounted in the first valve mounting chamber located above the first passageway, and a second spring loaded toggle valve is mounted in the second valve mounting chamber located above the second passageway. Each spring loaded toggle valve is substantially free of dead space and exhibits a positive valve closure at all times while performing a pressure release function as well. A dip tube projects from the first passageway at its junction with the bottom of the housing and extends into the cylinder to be emptied. The double valve also includes an inlet port attached to the housing at the junction of the third passageway and the side of the housing, and an outlet port attached to the housing at the junction of the fourth passageway and the side of the housing.

The first spring loaded toggle valve controls flow between the first and third passageways. In an "open" position, there is a passageway from the inlet port through the third passageway into the first passageway, through the dip tube and into the cylinder to be emptied. The second spring loaded toggle valve similarly controls flow between the second and fourth passageways. In an "open" position, there is a passageway from the cylinder through the second passageway, through the fourth passageway and through the outlet port. In a "closed" position, each spring loaded toggle valve blocks all communications between the passageways. In "intermediate" positions, each spring loaded toggle valve allows a controlled amount of communication between the passageways.

The double valve also includes a first and a second monitoring port. The first monitoring port is mounted to the side of the housing and communicates with the junction of the first passageway and third passageway. The second monitoring port is mounted to the side of the housing and communicates with a second passageway at a junction with a fourth passageway. The first and second monitoring ports enable a pressure measuring device to be connected across the double valve to measure the differential pressure between the output port and the input port. The differential pressure measuring device may be calibrated to directly indicate the depth of liquid remaining in the cylinder, thus monitoring the emptying process.

The contents of the cylinder are emptied by affixing a pressurized source of inert carrier gas to the input port and opening the first spring loaded toggle valve, thereby permitting the carrier gas to flow through the first and third passageways, through the dip tube and into the cylinder. A work tool is, or has been, connected to the output port and the second spring loaded valve is opened, permitting the now pressurized contents of the cylinder to escape (in the form of a mixture of carrier gas and liquid vapor) from the fourth and second passageways, and through the output port and into the work tool. "Work tool" refers to whatever apparatus consumes the gas mixture being emptied from the cylinder. Typically the work tool dispenses the gas into a heat source or into a vacuum to performing an etching, cleaning or coating process. A pressure measuring device connected across the first and second monitoring ports monitors the differential pressure at all times, and provides information as to the amount of liquid remaining in the cylinder.

BRIEF DESCRIPTION OF THE DRAWINGS

FIG. 1 is a perspective view of a double valve according to the present invention mounted on a cylinder and shows the pressurized source of inert gas, the work tool, and the pressure differential reading device.

FIG. 2 is a cross section along section line A—A of the double valve of FIG. 1.

FIG. 3 is a cross section along section line B—B of the double valve of FIG. 1.

DETAILED DESCRIPTION OF THE PREFERRED EMBODIMENT

FIG. 1 shows a gas cylinder 10 containing a volatile liquid 15 to be emptied, having a double valve 20 affixed to the cylinder top 22. Double valve 20 includes a housing 24 which protrudes from the cylinder top 22 and also extends into cylinder 10. Also protruding from the top 26 of the housing 24 are first valve control handle 28 connected to first spring loaded toggle valve 30 (not shown) and second valve control handle 38 connected to second spring loaded toggle valve 40 (not shown). Protruding from the bottom 50 of housing 24 is a dip tube 52 which extends into cylinder 10, extending to the bottom 54 of cylinder 10. (Cylinder 10 is shown in partial cutaway to reveal dip tube 52). Protruding from the sides 56 of valve housing 24 are an inlet port 60, an outlet port 65, a first monitoring port 70 and a second monitoring port 75. FIG. 1 shows a pressure monitoring device 80 connected between the first monitoring port 70 and the second monitoring port 75. Also shown in FIG. 1 is a source of pressurized inert gas 90 connected to the inlet port 60 and a work tool 95 connected to outlet port 65.

FIG. 2 shows the construction of the housing 24 in cross section detail. The housing 24 defines a first valve mounting chamber 96 and a second valve mounting chamber 97 extending inward from the top 26 of the housing 24. The housing 24 further defines a substantially vertically disposed cylindrical first passageway 100 extending from the lower end 102 of the first valve mounting chamber 96 downward to the bottom 50 of the housing 24. Similarly, the housing 24 defines an identically constructed second passageway 110 extending from the lower end 112 of the second valve mounting chamber 97 downward to the bottom 50 of the housing 24. Housing 24 also defines a substantially horizontal third cylindrical passageway 120 connecting at lower end 102 the first passageway 100 to side 56 of housing 24, and a similarly constructed fourth passageway 130 connecting at lower end 112 second passageway 110 to side 56. Dip tube 52 connects to the bottom 135 of the second passageway 110 and extends substantially to the bottom 54 of the cylinder 10 to be emptied (see FIG. 1).

As shown in FIG. 2, the first spring loaded toggle valve 30 is captively mounted in the first valve mounting chamber 96, and the second spring loaded toggle valve 40 is captively mounted in the second valve mounting chamber 97. The first spring loaded toggle valve 30 includes a stem 160 having a top 162 and a bottom 164, and a spring 166. The top 162 of the stem 160 is connected to the valve handle 28, (see FIG. 1). while the bottom 164 of the stem 160 is connected to a passageway blocking member 168. In a similar manner, the second spring loaded toggle valve 40 includes a stem 170 having a top 172 and a bottom 174, and a spring 176. The top 172 of stem 170 is connected to the valve handle 38, (see FIG. 1), while the bottom 174 of the stem 170 is connected to a passageway blocking member 178. Displacement of valve handles 28,38 causes displacement of stems 160, 170.

The passage blocking member 168 is shaped so as to block communications at lower end 102 between passageways 100 and 120 when the stem 160 is displaced in a first control position by movement of handle 28, and to controllably permit communications between passageways 100 and 120 when the stem 160 is displaced in a second control position. The passage blocking member 178 performs a similar function with passageways 110 and 130 at lower end 112 in response to displacement of the stem 170 caused by displacement of valve handle 38.

Note that the flow path provided by the cooperation of the blocking member and pathways eliminates any dead spaces where contaminant gases may be trapped. Thus, an unobstructed pathway between the cylinder and output port is provided.

As shown in FIG. 2, input port 60 mounts to the junction of side 56 and the substantially horizontal third passageway 120. Similarly, an output port 65 is mounted to the junction of side 56 and the substantially horizontal fourth passageway 130.

FIG. 3 shows a section taken along line B—B and illustrates first monitoring port 70 mounted on housing 24 and communicating with the first passageway 100 (perpendicular to the viewer's eye in FIG. 3) and third passageway 170. Similarly, a second monitoring port 75 is mounted on housing 24 and communicates with the second passageway 110 (perpendicular to the viewer's eye on FIG. 3) and fourth passageway 130. First monitoring port 70 and second monitoring port 75 are adapted to permit a pressure monitoring device 80 to be connected across the ports, thereby allowing the differential pressure between the monitoring ports to be read. Because the top 22 of the cylinder 10 provides only a limited area, it is necessary that the double valve 20 including the monitoring ports 70, 75 be compactly fabricated, as shown in the figures.

In use, a source of pressurized inert gas such as nitrogen or argon from tank 90 is attached by suitable means to inlet port 60. The first spring loaded toggle valve 30 is opened by means of valve handle 28, whereby pressurized inert gas is permitted to flow from the tank 90 through the inlet port 60, through the third passageway 120 to the first passageway 100, through the dip tube 52 and into the bottom 54 of cylinder 10. At the same time, a work tool 95 is connected by suitable means to output port 65 and the second spring loaded toggle valve 40 is opened by means of handle 38. As a result, the now pressurized contents of cylinder 10 enter the double valve 20 at the bottom 180 of the second passageway 110, flow through the second passageway 110, through the fourth passageway 130, through the outlet port 65 and into the work tool 95.

In a preferred embodiment, the double valve 20 includes first and second monitoring ports 70, 75. In use, a pressure differential monitoring device 80 is connected to the first and second monitoring ports 70, 75 and displays the differential pressure between the now pressurized contents of cylinder 10 and the pressure going into the work tool 95. A "Magnehelic-type" differential pressure measuring device, such as manufactured by the Dwyer Company of Michigan City, Ind., may be connected across the monitoring ports 70, 75. Because such measuring devices display differential pressure as inches of Mercury (or the equivalent), they may be calibrated to display the depth in inches (or equivalent) of the liquified gas remaining in the cylinder 10 being emptied.

In practice, it is not necessary to dispense the contents of cylinder 10 in 100% concentrated form. A more typical requirement is that the concentration be in the range of 1% to 10%. The temperature of the contents of the cylinder 10 determines the proportion of evaporated material contained in the pressurized inert gas. The temperature in turn depends upon the vapor pressure of the material being emptied. The use of an inert gas from pressurized tank 90 promotes cooling of cylinder 10, and is a safer situation than if tank 10 were heated to increase its internal pressure.

Modifications and variations may be made to the disclosed embodiments without departing from the subject of the invention as defined by the following claims. While the present invention uses toggle valves, other valve sealing techniques such as bellows sealing could be employed. Similarly, while the present invention is shown as having screw thread attachments, other attachments may be used.

What is claimed is:

1. A double valve for emptying a cylinder, independently of cylinder pressure, adapted to utilize a pressure monitoring device while emptying the cylinder, comprising:

a housing adapted to be attached to the top of the cylinder to be emptied, including a top, a bottom, and a side, said housing defining:

a first, substantially vertically disposed, valve mounting chamber having a first bottom and extending from said top downward into said housing, a first, substantially vertically disposed cylindrical passageway from said first bottom of said first chamber to said bottom of said housing, a second, substantially vertically disposed, valve mounting chamber having a second bottom and extending from said top downward into said housing, a second, substantially vertically disposed cylindrical passageway from said second bottom of said second chamber to said bottom of said housing, a third, substantially horizontally disposed cylindrical passageway from said first passageway adjacent said first bottom of said first chamber to said side, and a fourth, substantially horizontally disposed cylindrical passageway from said second passageway adjacent said second bottom of said second chamber to said side;

means for attaching said housing to the top of said cylinder to be emptied;

a dip tube, adapted to connect with said first passageway at said bottom of said housing, extending into said cylinder;

a first toggle valve, mounted in said first chamber, adapted to adjustably control communications between said first passageway and said third passageway, including a first passageway blocking member shaped to block communications between said first passageway and said third passageway when said first valve is disposed in a first control position, said first blocking member further shaped to provide unobstructed communications devoid of dead space between said first passageway and said third passageway when said first valve is disposed in a second control position;

a second toggle valve, mounted in said second chamber, adapted to adjustably control communications between said second passageway and said fourth passageway, including a second passageway blocking member shaped to block communications between said second passageway and said fourth passageway when said second passageway and said fourth passageway when said second valve is disposed in a first control position, said first blocking member further shaped to provide unobstructed communications devoid of dead space between said second passageway and said fourth passageway when said second valve is disposed in a second control position;

a first monitoring port, mounted in said side of said housing, including a first end communicating with the junction of said first passageway and said third passageway, and adapted to connect the pressure monitoring device for determining the pressure at the junction of said first passageway and said third passageway; and a second monitoring port, mounted in said side of said housing, including a first end communicating with the junction of said second passageway and said fourth passageway, and adapted to connect the pressure monitoring device for determining the pressure at the junction of said second passageway and said fourth passageway.

2. A double valve for emptying a cylinder, independently of cylinder pressure, adapted to utilize a pressure monitoring device while emptying the cylinder, comprising:

a housing, adapted to be attached to the top of the cylinder to be emptied, including a top, a bottom, and a side, said housing defining:

a first, substantially vertically disposed, valve mounting chamber having a first bottom and extending from said top downward into said housing, a first, substantially vertically disposed cylindrical passageway from said first bottom of said first chamber to said bottom of said housing, a second, substantially vertically disposed, valve mounting chamber having a second bottom and extending from said top downward into said housing, a second, substantially vertically disposed cylindrical passageway from said second bottom of said second chamber to said bottom of said housing, a third, substantially horizontally disposed cylindrical passageway from said first passageway adjacent said first bottom of said first chamber to said side, and a fourth, substantially horizontally disposed cylindrical passageway from said second passageway adjacent said second bottom of said second chamber to said side;

means for attaching said housing to the top of said cylinder to be emptied;

a dip tube, adapted to connect with said first passageway at said bottom of said housing, extending into said cylinder;

an inlet port attached to said housing at the junction of said side and said third passageway, adapted to sealably receive an inert gas source;

an outlet port attached to said housing at the junction of said side and said fourth passageway, adapted to sealably conduct the contents of said cylinder into a storage tank;

a first spring loaded toggle valve, mounted in said first chamber adapted to adjustably control communications between said first passageway and said third passageway, including a first passageway blocking member shaped to block communications between said first passageway and said third passageway when said first valve is disposed in a first control position, said first blocking member further shaped to provide unobstructed communications devoid of dead space between said first passageway and said third passageway when said first valve is disposed in a second control position;

a second spring loaded toggle valve, mounted in said second chamber, adapted to adjustably control communications between said second passageway and said fourth passageway, including a second passageway blocking member shaped to block communications between said second passageway and said fourth passageway when said second valve is disposed in a first control position, said first blocking member further shaped to provide unobstructed communications devoid of dead space between said second passageway and said fourth passageway when said second valve is disposed in a second control position;

a first monitoring port mounted in said side of said housing, including a first end communicating with the junction of said first passageway and said third passageway and adapted to connect the pressure monitoring device for determining the pressure at the junction of said first passageway and said third passageway; and a second monitoring port, mounted in said side of said housing, including a first end communicating with the junction of said second passageway and said fourth passageway, and adapted to connect the pressure monitoring device for determining the pressure at the junction of said second passageway and said fourth passageway;

whereby a pressurized source of inert gas is connected to said inlet port and upon opening said first spring loaded toggle valve, enters said cylinder volatilizing and emptying the cylinder contents through said outlet port upon opening said second valve, and a pressure monitor connected across said first monitoring port and said second monitoring port measures differential pressure across said monitoring ports said first and second spring loaded toggle valves providing an over pressure protection safety mechanism.

* * * * *